United States Patent

Arold et al.

[11] Patent Number: 5,062,353
[45] Date of Patent: Nov. 5, 1991

[54] HEATING OR AIR CONDITIONING EQUIPMENT FOR THE PASSENGER COMPARTMENT OF A MOTOR VEHICLE

[75] Inventors: Klaus Arold, Sindelfingen; Ulrich Bruhnke, Ehningen, both of Fed. Rep. of Germany

[73] Assignee: Mercedes-Benz AG, Fed. Rep. of Germany

[21] Appl. No.: 650,000

[22] Filed: Feb. 4, 1991

[30] Foreign Application Priority Data

Feb. 14, 1990 [DE] Fed. Rep. of Germany ....... 4004501

[51] Int. Cl.⁵ ............................................. B60H 3/06
[52] U.S. Cl. ..................................................... 98/2.11
[58] Field of Search ........................................... 98/2.11

[56] References Cited

U.S. PATENT DOCUMENTS 2,262,384  11/1941  Cooper ........................... 98/2.11 X
2,537,278   1/1951  Patterson ........................... 98/2.11
4,911,737   3/1990  Yehl et al. ..................... 98/2.11 X

FOREIGN PATENT DOCUMENTS 3727672  7/1988  Fed. Rep. of Germany.

Primary Examiner—Harold Joyce
Attorney, Agent, or Firm—Evenson, Wands, Edwards, Lenhahan & McKeown

[57] ABSTRACT

In heating or air conditioning equipment for the passenger compartment of a motor vehicle, the equipment being connected to the bulkhead on the passenger compartment side and covered by a dashboard provided with a glove compartment and having an air filter located on the air inlet side, it is proposed that, for easy insertion and removal of the air filter, the latter should be aligned at least approximately horizontally and located adjacent to the glove compartment insert. After the insert or a partial region of it has been removed or pivoted away, the air filter can be inserted and removed through the glove compartment opening.

4 Claims, 1 Drawing Sheet

HEATING OR AIR CONDITIONING EQUIPMENT FOR THE PASSENGER COMPARTMENT OF A MOTOR VEHICLE

BACKGROUND AND SUMMARY OF THE INVENTION

The invention concerns heating or air conditioning equipment for the passenger compartment of a motor vehicle, which equipment is connected to the bulkhead on the passenger compartment side, is covered by a dashboard provided with a glove compartment and has an air filter located on the air inlet side, which air filter is designed in particular as a dust filter.

Such heating or air conditioning equipment provided with a filter and associated with a bulkhead is known from German Patent Document DE-PS 37 27 672. Dust filters in particular, which cannot be regenerated locally by desorption (as can odor binding active carbon filters, for example) become blocked with dust particles in the course of time and must be removed and cleaned or replaced in order to ensure an adequate inflow of fresh air. This procedure proves difficult because it is only possible to carry out the removal and replacement from the bottom of the dashboard, where vision is not possible, because of the wall provided to the front and above by the dashboard. The insertion and removal of the filter is made additionally awkward because experience shows that even reaching the air filter is difficult due to the large number of supply lines under the dashboard in the region discussed.

An object of the invention is to design and locate the filter in such a manner that it is available for removal and replacement in a visible and easily achievable manner.

This object is achieved, for heating or air conditioning equipment of the generic type referred to above by providing an arrangement wherein the air filter is aligned at least approximately horizontally and is adjacent to the insert of the glove compartment, and wherein the air filter can be inserted and removed through the glove compartment opening after the insert or a partial region of it has been removed or pivoted away. In this way, filters can be accommodated in a cassette whose maximum extension in the vehicle transverse direction corresponds to the width of the opening of the glove compartment insert and the filter. If the filter is inserted in mat form or folded form, it can have—in its installed position—an extension in the vehicle transverse direction which is greater than the opening width of the glove compartment; it only has to be shortened temporarily by squeezing or fairly strong folding in order to pass it through the opening.

Filters enclosed at their boundaries by a frame, which do not pass through the opening of the glove compartment or must be arranged offset to the side relative to this opening, can be used if the air filter is divided at least once in the vehicle longitudinal direction and a filter section which can be inserted and removed in a straight line through the glove compartment opening is produced by the division. This makes it possible—when removing the filter, for example—initially to move the second and any other filter sections which cannot be drawn out in a straight line into the free space in the filter acceptance feature provided by the removal of the first filter section. Only then are they removed.

Removal of the glove compartment insert for filter insertion and filter removal becomes unnecessary if the back of the insert has an opening which can be closed.

Other objects, advantages and novel features of the present invention will become apparent from the following detailed description of the invention when considered in conjunction with the accompanying drawings.

DETAILED DESCRIPTION OF THE DRAWINGS

Figure 1:
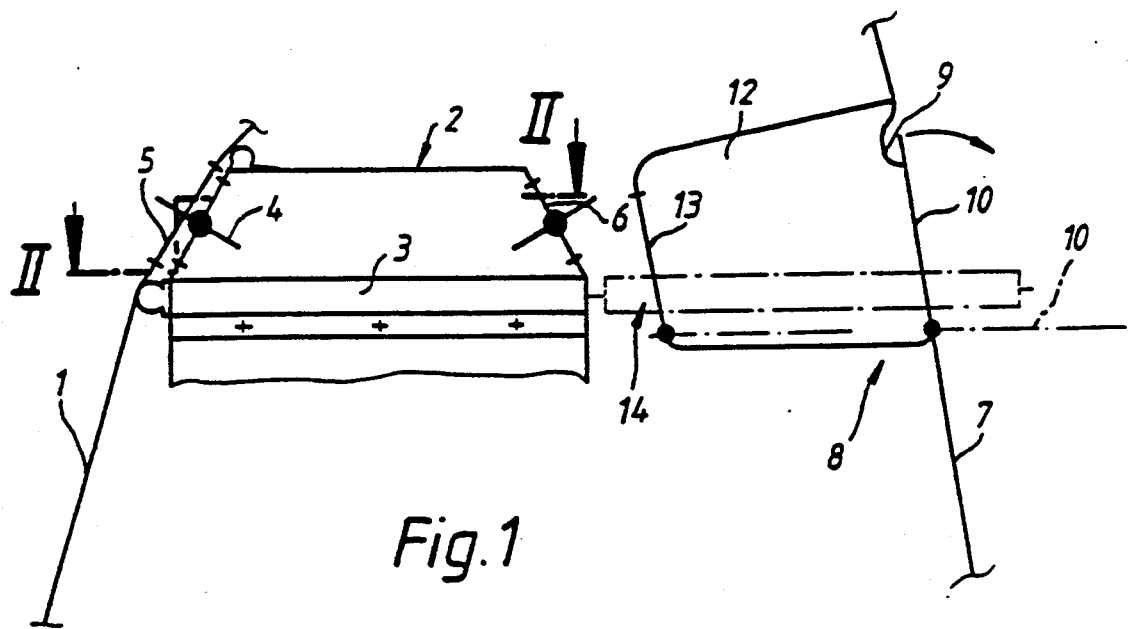
FIG. 1 shows an arrangement of a filter and glove compartment, greatly simplified and as seen in the vehicle transverse direction, constructed according to a preferred embodiment of the invention.

Connected to the bulkhead 1 of a motor vehicle, not shown in any more detail, is the air induction unit 2 of heating or air conditioning equipment, again not shown in any more detail, which accepts a filter 3 which can be subjected to fresh air and/or circulating air. The inlet flow of fresh air is controlled by a butterfly valve 4 to which fresh air is supplied via an opening 5 in the bulkhead 1 which is sealed against the air induction unit 2. A further butterfly valve 6, which permits the entry of circulating air when required, is provided on the side of the air induction unit 2 opposite to the butterfly valve 4. On the passenger compartment side, the air induction unit 2 is covered, in a manner not shown in any more detail, by a dashboard 7 which is equipped with a glove compartment 8.

This glove compartment 8 is equipped with a cover 10 provided with a grip recess 9 and it is possible to pivot the cover 10 downwards. An insert 12 for accepting utensils is connected to a glove compartment opening 11 which can be closed by the cover. This insert 12 can be easily removed, pivoted to the side or provided with a closable opening 13 in its back 14 so that access is possible to the appropriately placed air filter 3.

Figure 2:
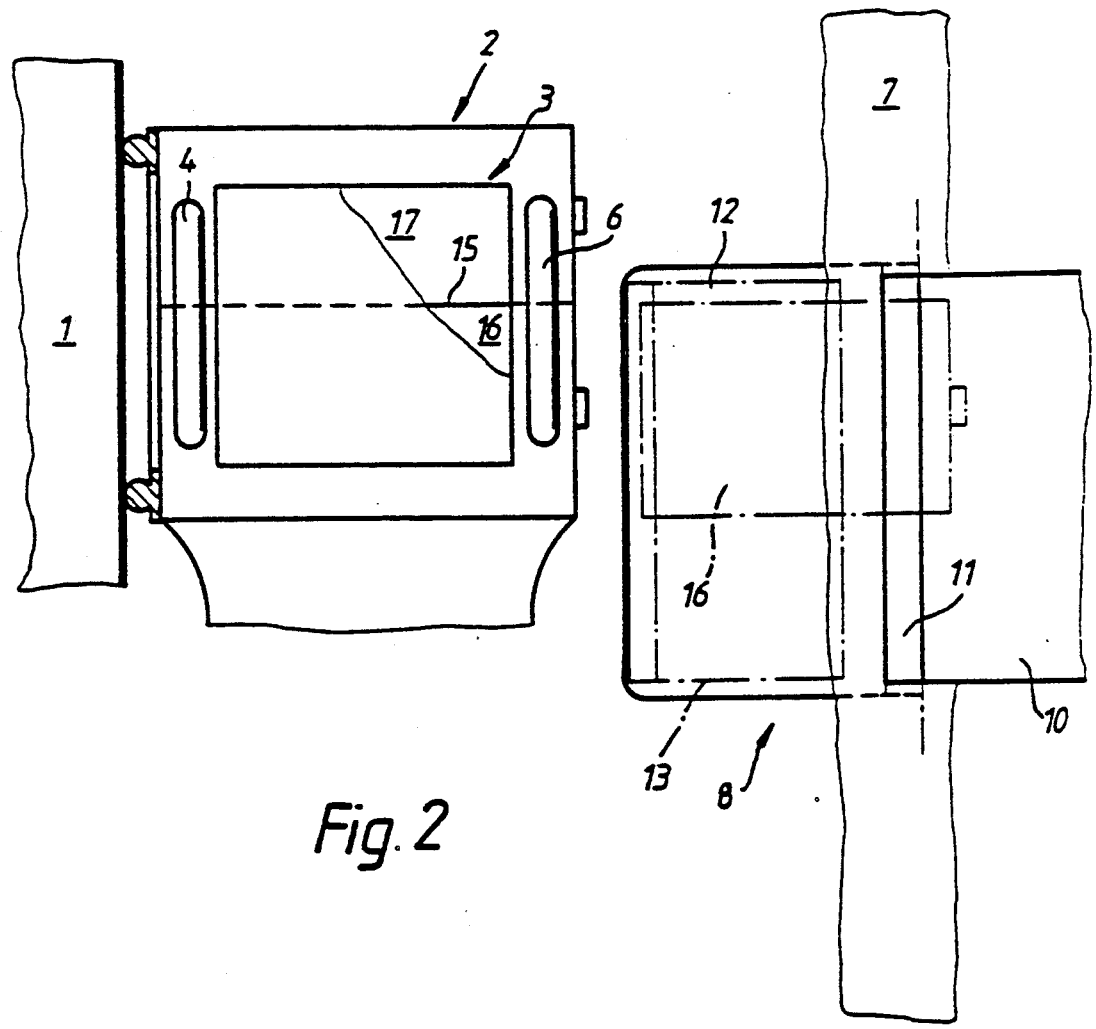
FIG. 2 shows a plan view of the arrangement of FIG. 1.

Given appropriate relative arrangement of the glove compartment opening 11 and the filter 3 with respect to placing and dimensions, it is possible to introduce or remove the filter 3 in total, possibly by temporarily squeezing it, for example. If, however, a lateral offset is provided between the glove compartment opening 11 and the filter 3, as is indicated in FIG. 2, and if the filter 3 is also accommodated in a cassette, not shown, it is then necessary to provide the filter 3 with at least one division 15 running in the longitudinal direction of the vehicle so that, referring to FIG. 2, two filter sections 16 and 17 are produced. The filter section 16 can then—as indicated—be removed in a straight line and the filter section 17 be pushed initially to the left into the gap which has now become free, subsequently being also removed in a straight line. When inserting a cleaned or new filter 3, its filter section 17 would be introduced first and pushed to the right into its final position and only then would the filter section 1 be introduced.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Heating or air conditioning equipment for the passenger compartment of a motor vehicle, which equipment is connected to the bulkhead on the passenger compartment side, is covered by a dashboard provided with a glove compartment and has an air filter located on the air inlet side, which air filter is designed in particular as a dust filter, wherein the air filter is aligned at least approximately horizontally and is adjacent to the insert of the glove compartment, and wherein the air filter can be inserted and removed through the glove compartment opening after the insert or a partial region of it has been removed or pivoted away.

2. Heating or air conditioning equipment according to claim 1, wherein the air filter is divided at least once in the vehicle longitudinal direction, and wherein a filter section which can be inserted and removed in a straight line through the glove compartment opening is produced by the division.

3. Heating or air conditioning equipment according to claim 1, wherein the back of the insert has an opening which can be closed.

4. Heating or air conditioning equipment according to claim 2, wherein the back of the insert has an opening which can be closed.

* * * * *